(12) United States Patent
Bax et al.

(10) Patent No.: US 12,247,863 B2
(45) Date of Patent: Mar. 11, 2025

(54) METHOD AND DEVICE FOR MEASURING A POWDER MASS FLOW FOR POWDER CLADDING

(71) Applicant: DMG MORI Ultrasonic Lasertec GmbH, Stipshausen (DE)

(72) Inventors: Benjamin Bax, Pfronten (DE); Christian Kledwig, Kempten (DE)

(73) Assignee: DMG MORI Ultrasonic Lasertec GmbH, Stipshausen (DE)

( * ) Notice: Subject to any disclaimer, the term of this patent is extended or adjusted under 35 U.S.C. 154(b) by 365 days.

(21) Appl. No.: 17/630,214

(22) PCT Filed: Jul. 28, 2020

(86) PCT No.: PCT/EP2020/071273
§ 371 (c)(1),
(2) Date: Jan. 26, 2022

(87) PCT Pub. No.: WO2021/028215
PCT Pub. Date: Feb. 18, 2021

(65) Prior Publication Data
US 2022/0283008 A1    Sep. 8, 2022

(30) Foreign Application Priority Data

Aug. 14, 2019 (DE) ............ 10 2019 121 948.5

(51) Int. Cl.
*G01F 9/00* (2006.01)
*B23K 26/342* (2014.01)
(Continued)

(52) U.S. Cl.
CPC ............ *G01F 9/003* (2013.01); *B23K 26/342* (2015.10); *B23K 26/702* (2015.10); *G01F 15/003* (2013.01); *G01F 25/14* (2022.01)

(58) Field of Classification Search
CPC ........ G01F 15/003; G01F 25/14; G01F 9/003; G01F 11/003; B23K 26/342; B23K 26/702
See application file for complete search history.

(56) References Cited

U.S. PATENT DOCUMENTS 5,798,466 A * 8/1998 Satake ............... G01F 25/10
73/861.73
6,057,515 A   5/2000 Murai et al.
(Continued)

FOREIGN PATENT DOCUMENTS

CN    109250504 A *  1/2019 ............ B65G 53/16
DE    4344701 A1     9/1995
(Continued)

OTHER PUBLICATIONS

International Search Report dated Nov. 25, 2020 for PCT App. Ser. No. PCT/EP2020/071273.

(Continued)

*Primary Examiner* — Paul M. West
(74) *Attorney, Agent, or Firm* — Henricks Slavin LLP (57) ABSTRACT

The innovation relates to a device and a method for measuring a powder mass flow for powder cladding. Before the powder cladding, the powder mass flow is set by means of a powder mass determining device and a powder mass flow sensor is calibrated on the basis of the setting. Then a powder switch is used to begin the powder cladding without interrupting the delivery of the powder mass. During the powder cladding, the powder mass flow is monitored by means of the powder mass flow sensor.

17 Claims, 4 Drawing Sheets

(51) Int. Cl.
  *B23K 26/70* (2014.01)
  *G01F 15/00* (2006.01)
  *G01F 25/10* (2022.01)

(56) References Cited

U.S. PATENT DOCUMENTS

| | | |
|---|---|---|
| 6,940,037 B1 | 9/2005 | Kovacevic et al. |
| 2001/0008230 A1 | 7/2001 | Keicher et al. |
| 2017/0028631 A1 | 2/2017 | Hyatt et al. |

FOREIGN PATENT DOCUMENTS

| | | | |
|---|---|---|---|
| DE | 10 2015 213 165 A1 | | 1/2017 |
| EP | 0547617 | A1 | 6/1993 |
| EP | 1950001 | A1 | 7/2008 |
| JP | 05-248916 | A | 9/1993 |
| JP | 11-28587 | A | 2/1999 |
| JP | 2013-501933 | A | 1/2013 |
| WO | WO2011019344 | A2 | 2/2011 |
| WO | WO 2015/155116 | A1 | 10/2015 |

OTHER PUBLICATIONS

*Regulate Powder Supply for The Laser Surface Treatment With Additional Materials*, Laser und Optoelektronik, Fachverlag GMBH. Stuttgart, DE, Band 25, Nr. 6, Dec. 1, 1993 (Dec. 1, 1993), p. 71-77.
Examination Report dated May 12, 2020 for German App. Ser. No. 10 2019 121 948.5 with English translation.
Office Action dated Apr. 25, 2023 for JP App. Ser. No. 2022-508845, with English language translation.
Office Action dated Aug. 22, 2023 for JP App. Ser. No. 2022-508845, with English language translation.
Office Action dated Apr. 4, 2024 for CN App. Ser. No. 202080057554.9, with English language translation.
Office Action dated May 13, 2024 for EPO App. Ser. No. 20750619.7, with English language translation.
Office Action dated Aug. 27, 2024 for JP App. Ser. No. 2022-508845, with English language translation.
Office Action dated Jan. 9, 2025 for CN App. Ser. No. 202080057554.9, with English language translation.

\* cited by examiner

METHOD AND DEVICE FOR MEASURING A POWDER MASS FLOW FOR POWDER CLADDING

TECHNICAL FIELD

The innovation relates to a device and a method for measuring a powder mass flow for powder cladding.

TECHNICAL BACKGROUND

Powder cladding has become increasingly important as an additive manufacturing process in recent years. In the case of powder cladding, powder is fed into a laser processing area in a targeted manner, wherein the powder composition, in particular the materials used and the powder particle sizes, may vary. In some manufacturing processes, the powder may be applied in an inert gas atmosphere.

In order to achieve a uniform application and a qualitatively uniform surface application, it is necessary to convey the powder to the laser processing area with a powder mass that is as constant as possible. The powder mass flow may vary depending on the powder composition, for example.

WO 2015/155116 A1 shows a method in which a powder jet is passed via various aperture openings in a laser processing area for test purposes. To determine the powder mass flow, a powder jet is passed through each aperture opening into a processing area for a specified period of time. The powder jet passed into the processing area is collected in a measuring cup and the collected powder mass is determined using a scale. Using the collected powder mass, an aperture with an associated powder jet is used for laser deposition welding.

EP 1 950 001 A1 shows a method in which a powder mass is fed into a high-energy jet over a specified period of time. The powder mass is then collected and a position of the powder jet relative to the high-energy jet is adjusted as a function of the powder mass collected and a specified value. In light of this, it is an object of the invention to provide a device and a method that improve the measurement of the powder mass flow.

DESCRIPTION OF THE INVENTION

The object of the invention is achieved by the features of the independent claims. The dependent claims relate to particular embodiments of the invention. The invention relates to a device and a method for measuring the powder mass flow for powder cladding.

According to the invention, the device comprises at least one powder metering device, a control unit, a powder mass flow sensor, a powder mass determination device and a powder switch. In some embodiments, the at least one powder metering device may include, for example, one or more conveyor belts, one or more pinch valves, one or more conveyor discs, and/or one or more screw conveyors.

In some embodiments, the control unit may consist of a plurality of control units. A control unit may, for example, comprise one or more analog and/or digital circuits. In some embodiments, the control unit may be configured to control one or more output parameters as a function of on at least one input parameter.

The powder mass flow sensor may be configured to determine a powder mass flow, for example via weight measurements, radiation attenuation measurements, reflection measurements, etc.

The powder switch may be configured to feed a powder mass flow to different consumers according to a control. In this case, consumers may be, for example, scales as a powder mass determination device and/or a process head.

According to the invention, the at least one powder metering device is configured to feed a powder mass via the powder mass flow sensor, depending on the powder switch, to scales and/or to a process head. This has the advantage that a powder mass flow can be adjusted without the powder mass being fed to the process head. On the other hand, once the powder mass flow has been set (work preparation), it is easy to switch to powder cladding since the powder mass flow is not interrupted. An interruption of the feed may lead to fluctuations in the feed of the powder mass, especially when switching on.

According to the invention, the control unit is configured to calibrate the powder mass flow sensor based on a powder mass flow measured by the scale. The powder mass flow may be monitored during powder mass cladding using the powder mass flow sensor. A calibration of the powder mass flow sensor may result in increased accuracy when monitoring the powder mass flow, since changes in the powder mass, in particular in a material and/or protective gas composition, may affect the sensory detection of the powder mass flow by means of the powder mass flow sensor.

In some embodiments, the control unit may be configured to adjust the powder metering device based on the powder mass flow measured by the scales and a specified powder mass flow. This has the advantage that an exact adjustment of the powder mass flow to a specified powder mass flow is possible ex situ, in particular before powder cladding.

In some embodiments, the control unit may be configured to adjust the powder metering device based on the powder mass flow detected by the powder mass flow sensor and a specified powder mass flow. This has the advantage that the powder mass flow can be monitored, in particular during powder cladding. Because the powder mass flow sensor can be calibrated using the scales prior to powder cladding, precise powder mass flow monitoring is possible in situ during powder cladding.

In a particularly efficient embodiment, the device comprises a centrifugal separator, a gravitational separator and/or an inertial separator between the powder switch and the scale, for separating the powder mass from a gas or gas mixture. Using other methods for separation of the powder mass from a gas or gas mixture is also conceivable. A separation of the powder mass from a gas or gas mixture has the advantage that a measurement of the powder mass flow using the scales becomes more accurate. For example, the shielding gas helium has a lower density than air, causing it to rise in an air-filled environment. As a result, for example, a measurement result from the scales may be distorted due to the buoyancy of the gas or a mass of the gas. Separating the powder mass from a gas or gas mixture prevents this distortion of the measurement result.

In a particularly robust embodiment, the control unit may be configured to control the powder mass flow via one or more pinch valves. Pinch valves have the advantage that they are particularly resistant to clogging and that pressure surges are reduced compared to other regulating valves. Particularly in the case of a control loop, the control of the powder mass flow to a target flow, oscillation can thus be suppressed and thus a settling time can be shortened.

In a particularly cost-effective embodiment, the scales may be configured to measure the powder mass flow by measuring a mass of solids deposited in a time interval. The measurement of the mass of solids separated in a time interval may be determined, for example, by forming a difference. In further embodiments, the scales may be recalibrated for this purpose or a zero point may be adjusted accordingly. The accuracy may be increased, for example, by increasing the time interval. This has the advantage that the powder mass flow can be measured relatively accurately with little effort.

In a particularly efficient embodiment, the control unit may be configured to, in a work preparation mode, carry out the steps of setting a feed rate of the at least one powder metering device per unit of time as a function of a specified powder mass flow and as a function of the powder mass flow measured by the scales and calibrating the powder mass flow sensor as a function of the specified powder mass flow and/r the powder mass flow measured by the scales. This has the advantage that before the powder cladding, the powder mass flow is set exactly by means of the powder mass determination device and the powder mass flow is monitored during powder cladding. Since the calibration is performed with the specified powder mass flow, the accuracy in monitoring the fed powder mass flow can be increased, in particular non-linear errors can be better compensated for with the calibration as a result. A powder mass flow that has a smaller deviation from a specified powder mass flow results in a more uniform application of the powder mass and an increased quality of the powder mass application.

In a particularly efficient embodiment, the control unit may be configured to carry out at least the following steps in order to perform the powder cladding: actuating the powder switch in order to feed the powder mass via the powder mass flow sensor to the process head in a working mode, and monitoring the powder mass flow using the powder mass flow sensor in the working mode. This has the advantage that it is possible to switch from a work preparation mode to a work mode without having to interrupt the powder mass feed. As a result, in particular at the start of the working mode, settling the fed powder mass flow on the specified powder mass flow can be prevented. This leads to an increased quality of powder mass application, especially when powder cladding is started.

In a particularly automated embodiment, the control unit may be configured to switch from the work mode to the work preparation mode when a deviation between the powder mass flow detected by the powder mass flow sensor and the specified powder mass flow exceeds a specified value. This has the advantage that the powder cladding is interrupted when the powder mass build-up deviates too much from a specified powder mass application. A specified quality of the powder mass application can thus be guaranteed. In addition, the powder mass flow can be adjusted again and/or the powder mass flow sensor can be calibrated again at the same time with the powder mass determination device. This also has the advantage that an error in the calibration of the powder mass flow sensor can be eliminated in a simple manner. In this way, a desired powder mass flow during powder cladding can be guaranteed in an automated manner.

According to the invention, the device may be configured to carry out the following method:

A method according to the invention may comprise the steps of: feeding a powder mass, determining the powder mass flow of the fed powder mass, calibrating a powder mass flow sensor as a function of the determined powder mass flow, feeding the powder mass with a predetermined powder mass flow via the powder mass flow sensor to the process head, and monitoring the powder mass flow using the powder mass flow sensor. A powder mass flow may be determined with scales, for example. The scales may be configured to measure a powder mass deposited on the scale over a predetermined time interval. This can be done, for example, by setting the zero point accordingly or by taking the difference between two measurement results. In some embodiments, the scales may include a powder mass receptacle. In some embodiments, the scales may be configured to clean the powder mass receptacle from a powder mass.

In particularly accurate embodiments, the method may comprise the step of separating the powder mass from a gas or a gas mixture before determining the powder mass flow. This has the advantage that the powder mass flow measured by the scales is not distorted by a gas or gas mixture. For example, helium has a lower mass than air and thus creates buoyancy in an air-filled space. When a powder mass is mixed with helium, for example as a shielding gas, the scales will measure a lower powder mass flow if the powder mass is not previously separated from the helium.

In particularly cost-effective embodiments, the powder mass flow may be measured using scales.

A particularly efficient embodiment may comprise the step of actuating a powder switch to change the feeding direction from a determination unit of the powder mass flow to the process head. This has the advantage that, in particular at the beginning of the powder cladding, settling in the powder mass feed is avoided since the powder mass is fed to the determination unit with a uniform powder mass flow before the powder cladding.

In a particularly advantageous embodiment, the feeding amount per unit of time may be controlled as a function of the determined powder mass flow of the fed powder mass and as a function of a specified powder mass flow. This has the advantage that the powder mass flow can be adjusted/controlled relatively precisely before powder cladding. Depending on the embodiment, a control unit may include, for example, a corresponding analog or digital closed-loop control.

In a particularly advantageous embodiment, the feeding amount per unit of time may be adjusted as a function of the sensor values of the powder mass flow sensor and as a function of a specified powder mass flow. This has the advantage that the fed powder mass flow can be controlled/adjusted during powder cladding according to a powder mass flow detected by the powder mass flow sensor. Thus, the fed powder mass flow can not only be monitored but also adjusted during powder cladding. A corresponding regulation/control may be implemented, for example, by means of a control unit and/or an analog or digital circuit.

In a particularly automated embodiment, the method may be carried out again when a deviation of the powder mass flow detected by the powder mass flow sensor from a specified powder mass flow exceeds a specified value. This has the advantage that there is an automated switch between powder cladding and the exact adjustment of the powder mass flow, including the calibration of the powder mass flow sensor, when it can be assumed that the fed powder mass flow deviates from the specified powder mass flow by more than a limit value. When the deviation of the powder mass flow from the specified powder mass flow is less than a specified value, powder cladding can be continued

In some embodiments, components may be combined, split into multiple components, and/or additional components may be added without affecting the functionality of the invention. In some embodiments, method steps can be switched in their order, carried out in parallel, combined or divided and/or further steps can be added without affecting the function of the method according to the invention.

Figure 1:
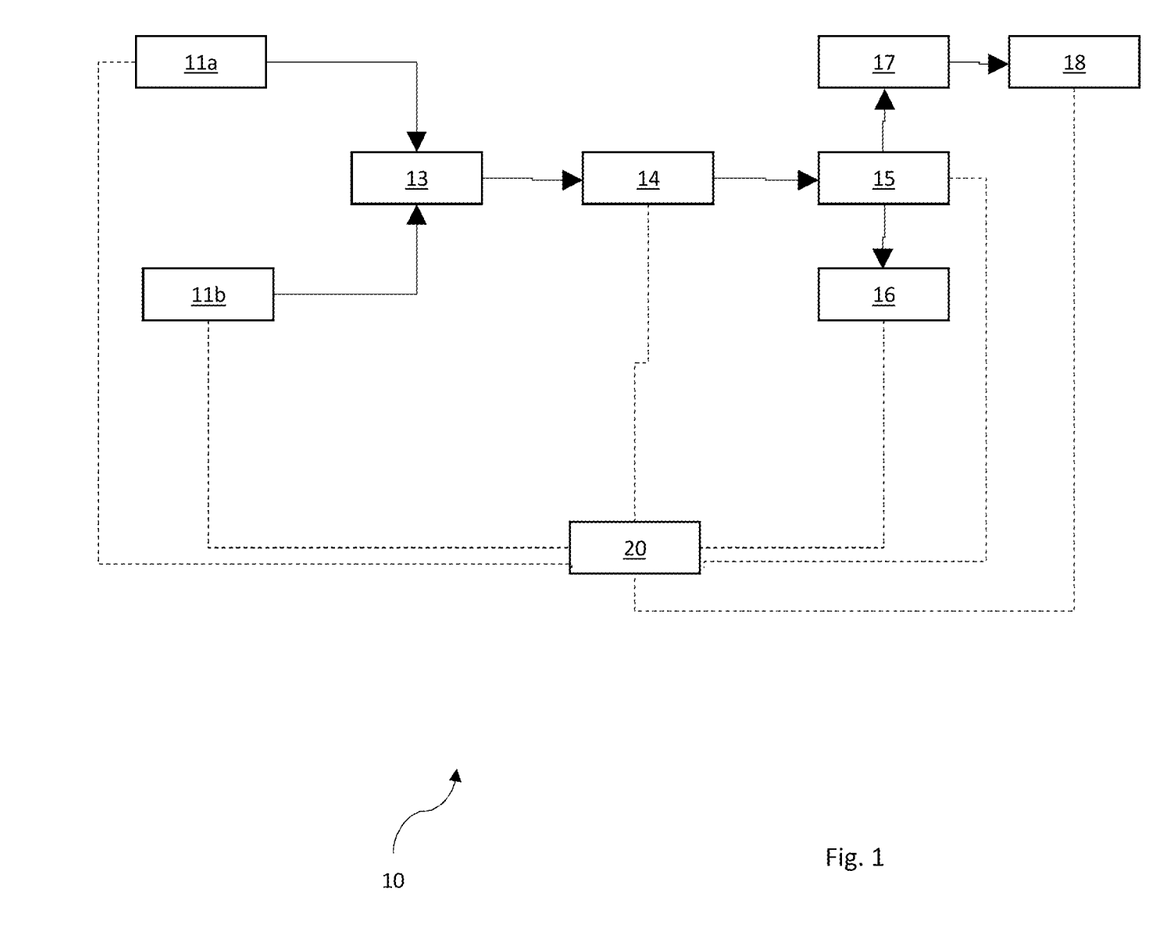
FIG. 1 schematically shows a device for measuring a powder mass flow for powder cladding according to an embodiment of the invention.

FIG. 1 schematically shows a device 10 for measuring a powder mass flow for powder cladding according to an embodiment of the invention. In FIG. 1, the powder mass flow is shown schematically with solid arrows. Dashed lines show connections for signal and/or data exchange between different components. The connections for signal and/or data transmission may be wired and/or wireless.

In this embodiment, the powder mass is fed by means of two powder metering devices, the powder metering devices 11a and 11b. The powder metering devices are configured to generate a powder mass flow. The powder mass flows are combined in a Y connection 13 to form a common powder mass flow. In an embodiment with a powder metering device, the Y-connection may optionally be omitted. In some embodiments, particularly when the device comprises multiple powder metering devices, the device may comprise multiple Y-connections and/or alternatives such as mixers or n-fold Y-connections.

The common powder mass flow generated in this way is routed to a powder switch 15 via a powder mass flow sensor 14. Depending on the driving of the powder switch 15, the powder switch directs the powder mass flow to a process head 16 and/or scales 18. The powder switch is controlled by the control unit 20 in this embodiment.

In this embodiment, a powder separator 17 is mounted between powder switch 15 and scale 18. It may be configured to separate the powder from a gas or gas mixture, in particular a shielding gas.

In some embodiments, the control device 20 may consist of a plurality of partially independent control devices. In this embodiment, the control device is configured to control and/or regulate the powder metering devices 11a, 11b as a function of sensor data from the powder mass flow sensor 14 and/or as a function of data/signals from the scales 18 and a specified powder mass flow.

In this embodiment, the control unit 20 is further configured to calibrate the powder mass flow sensor 14 as a function of data/signals from the scales 18 and/or a specified powder mass flow. The scales 18 may be configured, for example, to measure a powder mass flow by measuring a powder mass deposited on the scales 18 in a time interval. The powder mass flow is then obtained by dividing the measured powder mass by the length of the time interval.

In this embodiment, the control unit is configured to control the process head. The process head may be configured to be moved in one, two or three directions. In some embodiments, the process head may comprise a laser unit configured to introduce a predetermined energy into a laser processing area during powder cladding.

In some embodiments, the control unit is configured to direct the powder mass flow from the at least one powder metering device 11a, 11b via the powder mass flow sensors 14 to the scales by means of the powder switch in a work preparation mode. The powder mass is separated from gases and gas mixtures in the optional powder mass separator mounted upstream of the scale. In this embodiment, the control unit is configured to regulate and control the at least one powder metering device 11a, 11b in such a way that a specified powder mass flow is measured by means of the scale 18. If the at least one powder metering device is adjusted accordingly, the powder mass flow sensor 14 can be calibrated. The powder mass flow sensor can, for example, be configured optically, by means of radiation or by contact to detect a powder mass flow. In some embodiments, the sensor data of the powder mass flow sensor are simply adjusted according to a calibration.

After the calibration of the powder mass flow sensor, powder cladding may be carried out in this embodiment. In this embodiment, in order to switch to the work mode, i.e. powder cladding, the powder switch 15 is actuated via a control signal so that the powder mass flow is fed to the process head 16 instead of to the scales. This makes it possible to switch from a work preparation mode to the work mode without interrupting the powder mass feed.

During powder cladding, the powder mass flow is monitored using the powder mass flow sensor. This ensures a constant powder mass flow.

In some embodiments, the control unit may be configured to interrupt or abort the powder cladding when a deviation of the powder mass flow detected by the powder mass flow sensor from a specified powder mass flow exceeds a specified limit value. For this purpose, the powder switch 15 may be actuated by the control unit 20 so that the powder mass flow is fed from the powder switch 15 to the scales 18. Then the powder mass flow may be adjusted again using the scales and the powder mass flow sensor may be calibrated if necessary.

In some embodiments, the control unit may be configured to interrupt or abort the powder cladding based on an external signal, for example a sensor signal from a sensor for checking the powder mass deposition. In some versions, this may mean that there is a change from the work mode to the work preparation mode or that the powder cladding is aborted.

Figure 2:
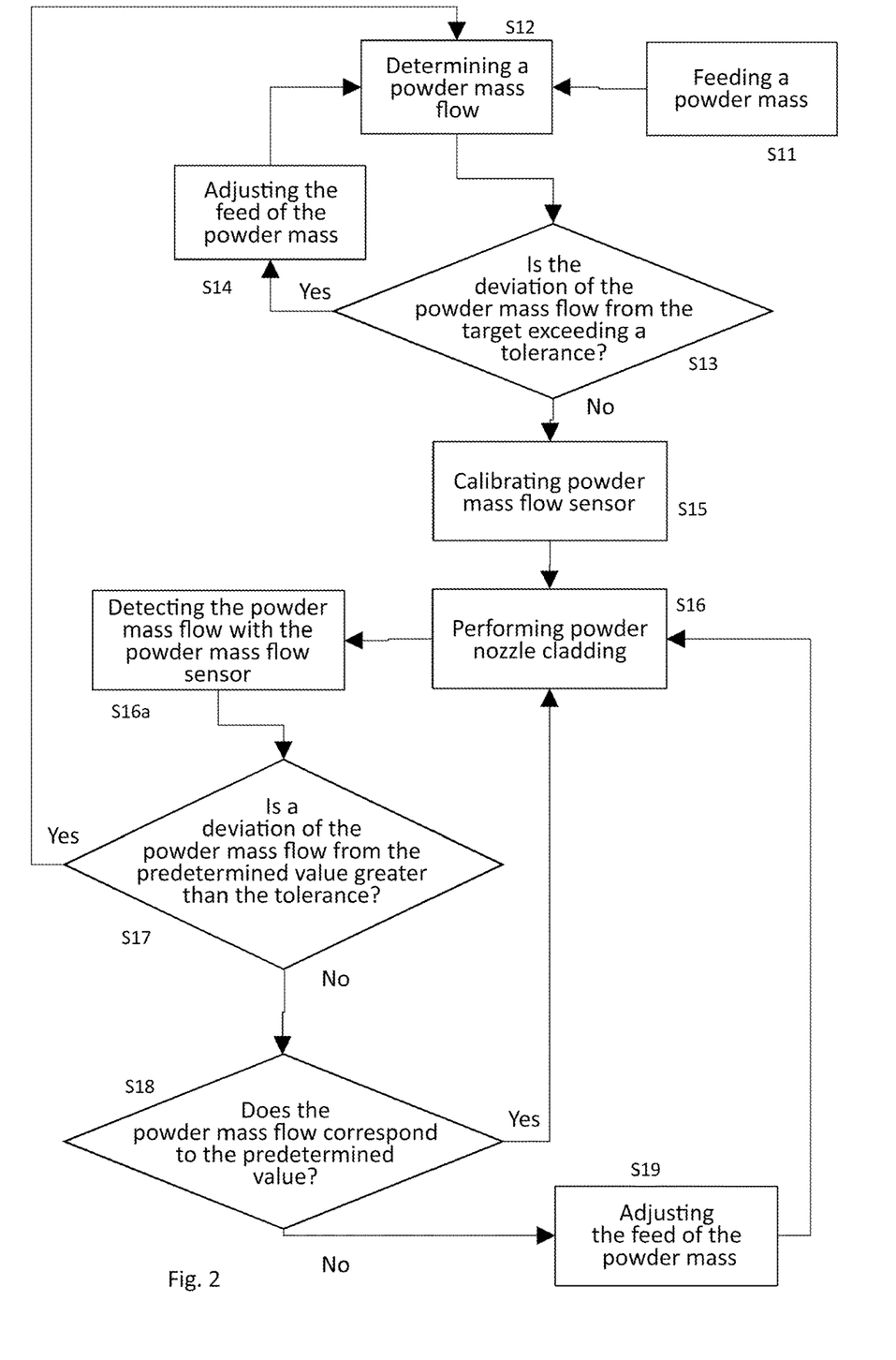
FIG. 2 schematically shows a process flow chart of a method according to an embodiment of the invention.

FIG. 2 schematically shows a process flow chart of a method according to an embodiment of the invention. In a first step S11, a powder mass is fed. The powder mass is preferably suitable as a powder for powder cladding. In a second step S12, a powder mass flow of the fed powder mass is determined. In a next step S13, depending on the determined powder mass flow, it is checked whether the powder mass flow deviates from a specified powder mass flow by more than a specified tolerance. If the deviation is greater than the tolerance, the feed of the powder mass is adjusted via step S14 and the powder mass flow is determined again in step S12. If the deviation is less than the tolerance, a powder mass flow sensor is calibrated in step S15 using the determined powder mass flow.

On the basis of the preparations for the powder cladding in steps S11 to S15, the powder cladding can be carried out in a step S16. In order to switch from the steps of preparation to carrying out the powder cladding S16, for example, a powder switch may be actuated to change the feeding direction to a process head of a powder cladding unit instead of to a determination unit for determining the powder mass flow, see step S12.

During powder cladding S16, the powder mass flow is monitored using the powder mass flow sensor in steps S16a, S17-S19. In step S16a the powder mass flow is detected by means of the powder mass flow sensor. In step S17, it is checked whether a deviation of the powder mass flow detected by means of the powder mass flow sensor from a specified powder mass flow is greater than a specified tolerance value. If the deviation is greater, the powder cladding is interrupted and the process continues with step S12 of determining the powder mass flow. Depending on the embodiment, when steps S12 to S16 are carried out again, step S15 of calibrating the powder mass flow sensor may be skipped.

If the deviation of the detected powder mass flow from the specified powder mass flow is within the tolerance range, it is checked in step S18 whether the detected powder mass flow corresponds to the specified value. If the detected powder mass flow corresponds to the specified powder mass flow, the execution of the powder cladding is continued with step S16. If the values do not match, the feed of the powder mass is adjusted in step S19 and the procedure also continues with step S16 of carrying out the powder cladding.

In some embodiments, step S16 of carrying out the powder cladding can be continued after step S18 if a deviation of the detected powder mass flow from the specified powder mass flow is below a further tolerance value. Otherwise, the procedure continues with step S19 of adjusting the feed of the powder mass. In some embodiments, the tolerance values of step S17 and step S18 may have the same value.

In some embodiments, steps S16, S16a, S17-S19, which include monitoring the powder mass flow during powder cladding with the powder mass flow sensor, among others, may be performed in a different order, with additional steps, may at least be partially combined, etc.

Figure 3:
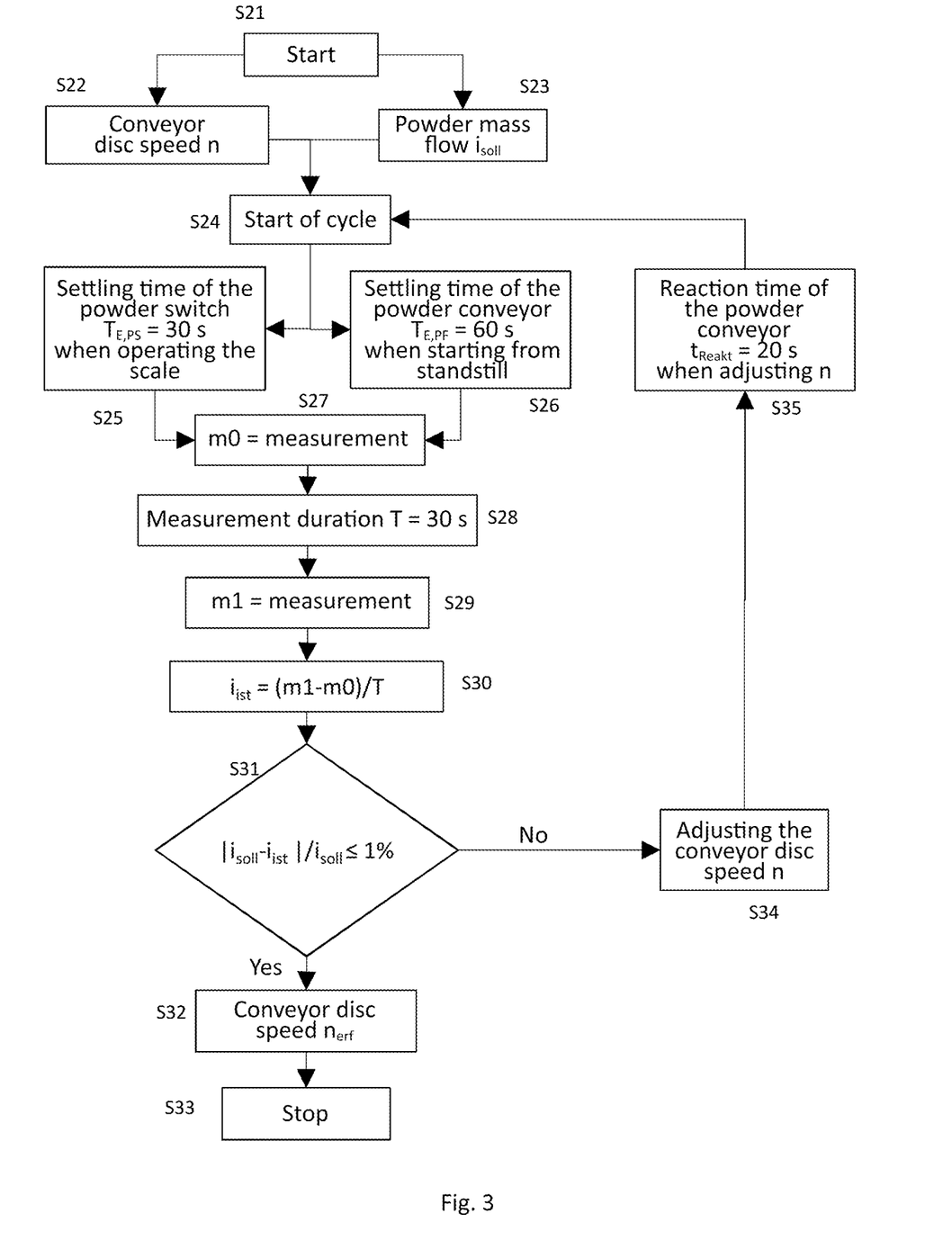
FIG. 3 schematically shows a process flow chart of a method for measuring/determining the powder mass flow according to an embodiment of the invention.

FIG. 3 schematically shows a process flow chart of a method for measuring/determining the powder mass flow according to an embodiment of the invention. Upon the start S21 of the method, a powder mass flow list is generated in a step S22 by means of a conveyor disk speed n. In this embodiment, the powder metering device is a conveyor disk. In this embodiment, a specified powder mass flow $i_{soll}$ is transferred in parallel. After the start of the method, the measurement cycle S24 begins.

Depending on whether the cycle has just started, including the powder switch to the scale being actuated, step S26 or step S25 is performed. If the cycle has started from a standstill, the settling of the powder conveyor/powder metering device, in this exemplary embodiment 60 seconds, is waited for in step S26. When the powder switch to the scales is actuated, the passage of a settling time of the powder switch, 30 seconds in this exemplary embodiment, is waited for in step S25. Steps S25 and S26 may be skipped when neither the powder switch has been actuated nor the powder feeder has been activated from standstill.

In a next step S27, a first measurement of a powder mass m0 is carried out on scales. In a further step S28, the passage of a time interval/measurement duration T, 30 seconds in this exemplary embodiment, is waited for. During the time interval/measuring period T, the powder mass flow is fed onto the scale. A second measurement of the powder mass m1 is then carried out in step S29. In the next step S30, the powder mass flow is determined using the equation $i_{ist}=(m1-m0)/T$.

In a further step S31, a deviation of the powder mass flow $i_{soll}$ from the specified powder mass flow is determined. In this exemplary embodiment, the deviation is determined using the formula $|i_{soll}-i_{ist}|/i_{soll}$. If the deviation is below a specified tolerance, 1% in this exemplary embodiment, the conveyor disk speed $n_{erf}$ for feeding the specified powder mass flow $i_{soll}$ is specified with the conveyor disk speed n and the measurement/determination of the powder mass flow i can be completed in step S33.

If the deviation is greater than the specified tolerance, the speed of the conveyor disk n is adjusted in step S34. Depending on the embodiment, the passage of a reaction time of the powder metering device, in this exemplary embodiment 20 seconds, may be waited for in a step S35 before the cycle starts again with step S24.

Figure 4:
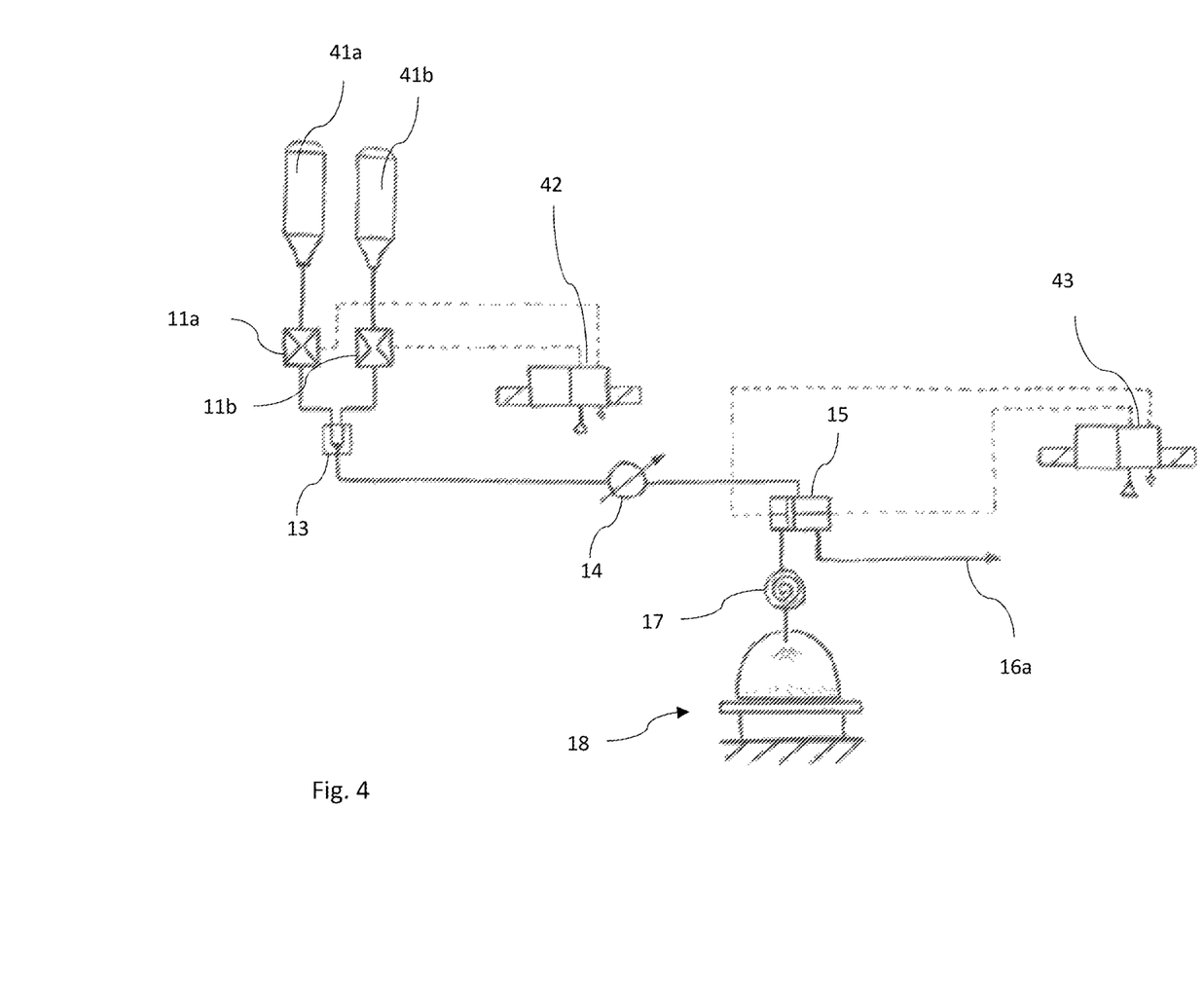
FIG. 4 schematically shows a device for measuring a powder mass flow for powder cladding according to an embodiment of the invention.

FIG. 4 schematically shows a device for measuring a powder mass flow for powder cladding according to an embodiment of the invention. In this embodiment, pinch valves 11a, 11b meter the powder fed by powder conveyors 41a, 41b. The resulting powder streams are combined into one stream by means of the Y-connection 13. In this exemplary embodiment, the pinch valves are controlled via the directional valve for driving one or more metering devices. The powder mass flow is fed from the Y-connection 13 to the powder switch 15 via the powder mass flow sensor 14

As shown in this embodiment, the powder switch 15 may be controlled by means of the directional valve for driving the powder switch 43. A possible position is that the powder mass flow is fed to the process head 16 via the powder transport 16a. In a further possible position, the powder mass flow is fed onto a scale 18. A powder separator 17 may be arranged on the feeding path between the scales 18 and the powder switch 15. In some embodiments, the directional valve for driving one or more metering devices 42, the directional valve for controlling the powder switch, the scale 18, the mass flow sensor 14, the powder separator and/or the process head may be connected to one another, for example, via one or more control units.

The control unit may be configured, for example, to control/regulate the powder mass flow using the directional valve for driving one or more metering devices 42 based on data/signals provided by the powder mass flow sensor 14 and/or the scales 18. In some embodiments, the control unit may be configured to control the powder switch by means of the directional valve for driving the powder switch and thus to switch between a work preparation mode and a work mode of powder cladding.

In the work preparation mode, a predetermined powder mass flow may be adjusted by means of the scales 18, the directional valve for driving one or more metering devices 42 and one or more metering devices 11a, 11b. The powder mass flow sensor 14 may preferably be calibrated after the powder mass flow has been adjusted. In order to then switch to the work mode without interruption, the powder mass flow can be fed to the process head 16 by actuating the directional valve for driving the powder switch 43. While the powder is being fed to the process head 16, the powder mass flow that is being fed may be monitored by means of the powder mass flow sensor 14.

In some embodiments, the control unit may be configured to automatically switch to the work preparation mode and adjust the powder mass flow again when the powder mass flow sensor 14 detects an excessive deviation from a specified value. This has the advantage that when, for example, powder from a first batch runs out during powder cladding and powder from a second batch is fed, it is ensured that the powder mass flow corresponds to a target value.

LIST OF REFERENCE SYMBOLS 11a, 11b powder metering device
13 Y-connection
14 powder mass flow sensor
15 powder switch 16 process head
16a powder transport to the process head 16
17 powder separator
18 scales
20 control unit
41a, 41b powder conveyor
42 directional valve for driving one or more metering devices
43 directional valve for driving the powder switch
$i_{ist}$ measured/detected powder mass flow
$i_{soll}$ specified powder mass flow
T time interval/measurement duration
m0 first weight measurement
m1 second weight measurement
n speed of the conveyor disc
$n_{erf}$ conveyor disk speed for feeding $i_{soll}$

The invention claimed is:

1. A device (10) for measuring a powder mass flow, comprising:
   at least one powder metering device (11a, 11b) configured to generate a powder mass flow of powder for powder cladding,
   a control unit (20),
   a powder mass flow sensor (14),
   a powder mass determination device (18),
   a powder switch (15), and
   a centrifugal separator, a gravity separator and/or an inertial separator (17) between said powder switch (15) and said powder mass determination device (18) and configured to separate the powder for powder cladding from a gas or gas mixture,
   wherein the powder switch (15) is configured to change a feeding direction of the powder mass flow of powder for powder cladding between the powder mass flow determination device (18) and a process head (16) of a powder cladding unit,
   wherein said at least one powder metering device (11a, 11b) is configured to feed the powder mass of powder for powder cladding via said powder mass flow sensor (14) to the powder mass determination device (18) and to the process head (16), depending on said powder switch (15), and
   wherein said control unit (20) is configured to calibrate said powder mass flow sensor (14) based on a powder mass flow measured by said powder mass determination device (18).

2. The device according to claim 1, wherein
said control unit (20) is configured to adjust said powder metering device (11a, 11b) based on the powder mass flow measured by said powder mass determination device (18) and a specified powder mass flow.

3. The device according to claim 1, wherein
said control unit (20) is configured to adjust said powder metering device (11a, 11b) based on the powder mass flow detected by said powder mass flow sensor (14) and a specified powder mass flow.

4. The device according to claim 1, wherein
said control unit (20) is configured to control the powder mass flow via one or more pinch valves (11a, 11b).

5. The device according to claim 1, wherein
said powder mass determination device (18) is configured to measure the powder mass flow by measuring a mass of solids deposited in a time interval.

6. The device according to claim 1, wherein
said control unit (20) is configured to carry out the following steps in a work preparation mode:
   adjusting a feeding amount of said at least one powder metering device (11a, 11b) per unit of time as a function of a specified powder mass flow and as a function of the powder mass flow measured by said powder mass determination device (18), and
   calibrating said powder mass flow sensor (14) as a function of the specified powder mass flow and/or the powder mass flow measured by said powder mass determination device (18).

7. The device according to claim 1, wherein
said control unit (20) is configured to execute at least the following steps in order to carry out the powder cladding:
   actuating said powder switch (15) in order to feed the powder mass via said powder mass flow sensor (14) to said process head (16) in a working mode, and
   monitoring the powder mass flow using said powder mass flow sensor (14) in the working mode.

8. The device according to claim 7, wherein
said control unit (20) is configured to switch from the work mode to the work preparation mode when a deviation between the powder mass flow detected by said powder mass flow sensor (14) and the specified powder mass flow exceeds a specified value.

9. An apparatus, comprising:
   a device (10) for measuring a powder mass flow as claimed in claim 1, and
   a process head (1) operably connected to the device (10) for measuring a powder mass flow.

10. The apparatus according to claim 9, wherein
the process head comprises a laser unit configured to introduce a predetermined energy into a laser processing area during a powder cladding process.

11. A method for measuring a powder mass flow, comprising the steps of:
   feeding a powder mass of powder for powder cladding,
   separating the powder for powder cladding from a gas or a gas mixture,
   determining the powder mass flow of the fed powder mass of powder for powder cladding after the powder for powder cladding has been separated from the gas or the gas mixture,
   calibrating a powder mass flow sensor as a function of the determined powder mass flow of powder for powder cladding,
   feeding the powder mass of powder for powder cladding with a specified powder mass flow via said powder mass flow sensor to a process head of a powder cladding apparatus, and
   monitoring the powder mass flow using said powder mass flow sensor.

12. The method according to claim 11, wherein
the powder mass flow is measured using scales.

13. The method according to claim 11, comprising the steps of:
   actuating a powder switch to change the feeding direction from a powder mass flow determination unit to said process head.

14. The method according to claim 11, wherein
the feeding amount per unit of time is controlled as a function of the determined powder mass flow of the fed powder mass and as a function of a specified powder mass flow.

15. The method according to claim 11, wherein
the feeding amount per unit of time is adjusted as a function of the sensor values of said powder mass flow sensor and as a function of a specified powder mass flow.

16. The method according to claim 11, wherein
said method is carried out again when a deviation of the powder mass flow detected by said powder mass flow sensor from a specified powder mass flow exceeds a specified value.

17. A method, comprising:
controlling a powder cladding process based on a measurement of powder mass flow of a powder mass of powder for powder cladding in the manner claimed in claim 11.

* * * * *